United States Patent
Kim et al.

(10) Patent No.: US 8,374,143 B2
(45) Date of Patent: Feb. 12, 2013

(54) METHOD OF TRANSMITTING UPLINK DATA IN WIRELESS COMMUNICATION SYSTEM

(75) Inventors: Hak Seong Kim, Seoul (KR); Bong Hoe Kim, Seoul (KR); Joon Kui Ahn, Seoul (KR); Ki Jun Kim, Seoul (KR); Dae Won Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 292 days.

(21) Appl. No.: 12/866,216

(22) PCT Filed: Mar. 17, 2009

(86) PCT No.: PCT/KR2009/001344
§ 371 (c)(1),
(2), (4) Date: Aug. 4, 2010

(87) PCT Pub. No.: WO2009/116789
PCT Pub. Date: Sep. 24, 2009

(65) Prior Publication Data
US 2010/0329220 A1  Dec. 30, 2010

Related U.S. Application Data

(60) Provisional application No. 61/036,999, filed on Mar. 17, 2008, provisional application No. 61/039,404, filed on Mar. 25, 2008.

(51) Int. Cl.
*H04W 4/00* (2009.01)

(52) U.S. Cl. ......... 370/329; 370/280; 455/450; 709/236

(58) Field of Classification Search .................. 370/264, 370/280, 329, 336, 337, 412; 455/224, 450, 455/464, 522; 709/227, 235, 236
See application file for complete search history.

(56) References Cited

U.S. PATENT DOCUMENTS

| | | | | |
|---|---|---|---|---|
| 6,134,230 A | * | 10/2000 | Olofsson et al. | 370/337 |
| 6,681,256 B1 | * | 1/2004 | Kuntze et al. | 709/236 |
| 2002/0114292 A1 | * | 8/2002 | Kawabata et al. | 370/329 |
| 2002/0150058 A1 | | 10/2002 | Kim et al. | |
| 2003/0156557 A1 | * | 8/2003 | Kalden et al. | 370/329 |
| 2005/0266896 A1 | | 12/2005 | Son et al. | |
| 2008/0070615 A1 | * | 3/2008 | Obuchi et al. | 455/522 |

FOREIGN PATENT DOCUMENTS

| | | |
|---|---|---|
| CN | 1379600 | 11/2002 |
| CN | 1536793 | 10/2004 |
| CN | 1839636 | 9/2006 |
| EP | 1764934 | 3/2007 |
| EP | 1890404 | 2/2008 |

* cited by examiner

*Primary Examiner* — Andrew Lai
(74) *Attorney, Agent, or Firm* — Lee, Hong, Degerman, Kang & Waimey

(57) ABSTRACT

A method of transmitting uplink data in a wireless communication system is provided. The method includes receiving an uplink grant and transmitting uplink data through a resource block which is indicated by the resource block index in a control region of a slot indicated by the slot indicator in the subframe.

8 Claims, 14 Drawing Sheets

| | 1st slot | 2nd slot | | |
|---|---|---|---|---|
| I=24 | m=1(24) | m=0(0) | I=24, Irev=0 | Control region |
| I=23 | Not reserved(23) | m=2(1) | I=23, Irev=1 | |
| I=22 | (22) | (22) | I=22, Irev=2 | |
| I=21 | (21) | (21) | I=21, Irev=3 | |
| I=20 | (20) | (20) | I=20, Irev=4 | |
| I=19 | (19) | (19) | I=19, Irev=5 | |
| I=18 | (18) | (18) | I=18, Irev=6 | |
| I=17 | (17) | (17) | I=17, Irev=7 | |
| ⋮ | ⋮ | ⋮ | ⋮ | Data region |
| I=7 | (7) | (7) | I=7, Irev=17 | |
| I=6 | (6) | (6) | I=6, Irev=18 | |
| I=5 | (5) | (5) | I=5, Irev=19 | |
| I=4 | (4) | (4) | I=4, Irev=20 | |
| I=3 | (3) | (3) | I=3, Irev=21 | |
| I=2 | (2) | (2) | I=2, Irev=22 | |
| I=1 | m=2(1) | Not reserved(23) | I=1, Irev=23 | Control region |
| I=0 | m=0(0) | m=1(24) | I=0, Irev=24 | |

Subframe spans both slots.

| | Subframe | | | |
|---|---|---|---|---|
| | 1st slot | 2nd slot | | |
| I=24 | m=1(24,OFF) | m=0(0,ON) | I=24 , Irev=0 | ⎫ Control |
| I=23 | Not reserved(23,OFF) | m=2(1,ON) | I=23 , Irev=1 | ⎭ region |
| I=22 | | | I=22 , Irev=2 | |
| I=21 | | | I=21 , Irev=3 | |
| I=20 | | | I=20 , Irev=4 | |
| I=19 | | | I=19 , Irev=5 | |
| I=18 | | | I=18 , Irev=6 | |
| I=17 | | | I=17 , Irev=7 | |
| ⋮ | ⋮ | ⋮ | ⋮ | Data region |
| I=7 | | | I=7 , Irev=17 | |
| I=6 | | | I=6 , Irev=18 | |
| I=5 | | | I=5 , Irev=19 | |
| I=4 | | | I=4 , Irev=20 | |
| I=3 | | | I=3 , Irev=21 | |
| I=2 | | | I=2 , Irev=22 | |
| I=1 | m=2(1,OFF) | Not reserved(23,ON) | I=1 , Irev=23 | ⎫ Control |
| I=0 | m=0(0,OFF) | m=1(24,ON) | I=0 , Irev=24 | ⎭ region |

METHOD OF TRANSMITTING UPLINK DATA IN WIRELESS COMMUNICATION SYSTEM

CROSS-REFERENCE TO RELATED APPLICATIONS

This application is the National Stage filing under 35 U.S.C. §371 of International Application No. PCT/KR2009/001344, filed on Mar. 17, 2009, which claims the benefit of U.S. Provisional Application Ser. Nos. 61/036,999, filed on Mar. 17, 2008, and 61/039,404, filed on Mar. 25, 2008.

TECHNICAL FIELD

The present invention relates to a wireless communication, and more particularly, to a method of transmitting uplink data in a wireless communication system.

BACKGROUND ART

Wireless communication systems are being widely deployed in order to provide various kinds of communication services, such as voice or data. The object of the wireless communication systems enables a number of users to perform reliable communication with each other irrespective of their position and mobility.

In general, the wireless communication system is multiple access system capable of supporting communication with multiple users by sharing available radio resources. The radio resources may include, for example, time, frequency, codes, and transmission power. The multiple access system may include, for example, a Time Division Multiple Access (TDMA) system, a Code Division Multiple Access (CDMA) system, a Frequency Division Multiple Access (FDMA) system, an Orthogonal Frequency Division Multiple Access (OFDMA) system, and a Single Carrier Frequency Division Multiple Access (SC-FDMA) system.

SC-FDMA has a low Peak-to-Average Power Ratio (PAPR) owing to a single carrier property while having almost the same complexity as OFDMA. A lower PAPR is advantageous to user equipments in terms of transmission power efficiency. SC-FDMA has been adopted for uplink transmission in 3rd Generation Partnership Project (3GPP) Long Term Evolution (LTE) (3GPP LTE) as described in the fifth section of 3GPP TS 36.211 V8.1.0 (2007-11) "Technical Specification Group Radio Access Network; Evolved Universal Terrestrial Radio Access (E-UTRA); Physical Channels and Modulation (Release 8)."

A base station properly allocates radio resources to each of user equipments in a cell through scheduling. Each of the user equipments may transmit control information or user data to the base station using the radio resources allocated thereto. However, a method of transmitting the control information and a method of transmitting the user may differ. A method of allocating radio resources for the control information and a method of allocating radio resources for the user data may also differ. Accordingly, the radio resources for the control information and the radio resources for the user data may differ. The base station may separately manage the radio resources reserved for the control information and the radio resources reserved for the user data. However, the amount of the radio resources reserved for the control information may be greater than the amount of radio resources actually necessary to transmit the control information, and the amount of the radio resources reserved for the user data may be smaller than the amount of radio resources actually necessary to transmit the user data. Although the radio resources necessary to transmit the user data is insufficient, radio resources, left over after the radio resources reserved for the control information have been used to transmit the control information, are not used to transmit control information or user data. Accordingly, a problem arises because limited radio resources are wasted.

Accordingly, there is a need for a method of transmitting uplink data which is capable of efficiently using limited radio resources.

DISCLOSURE OF INVENTION

Technical Problem

The present invention provides a method of transmitting uplink data in a wireless communication system.

Technical Solution

In one aspect, a method of transmitting uplink data in a wireless communication system, carried in a user equipment (UE), is provided. The method includes receiving an uplink grant from a base station (BS), the uplink grant comprising a resource allocation field and a slot indicator, the resource allocation field comprising a resource block index which is an index of a resource block selected among a plurality of resource blocks in a control region of a subframe, the slot indicator indicating one of two slots in the subframe and transmitting uplink data through a first resource block which is indicated by the resource block index in a slot indicated by the slot indicator in the subframe.

In another aspect, an apparatus for a wireless communication is provided. The apparatus includes a signal generator configured to generate and transmit a radio signal and a processor coupled with the signal generator and configured to receive an uplink grant, the uplink grant comprising a resource allocation field and a slot indicator, the resource allocation field comprising a resource block index which is an index of a resource block selected among a plurality of resource blocks in a control region of a subframe, the slot indicator indicating one of two slots in the subframe and transmit data through a resource block which is indicated by the resource block index in a slot indicated by the slot indicator in the subframe.

ADVANTAGEOUS EFFECTS

There is provided a method of transmitting uplink data in a wireless communication system. Accordingly, the entire performance of a system can be improved.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE employs the OFDMA in downlink and employs the SC-FDMA in uplink.

For clarity, the following description will focus on the 3GPP LTE. However, technical features of the present invention are not limited thereto.

Figure 1:
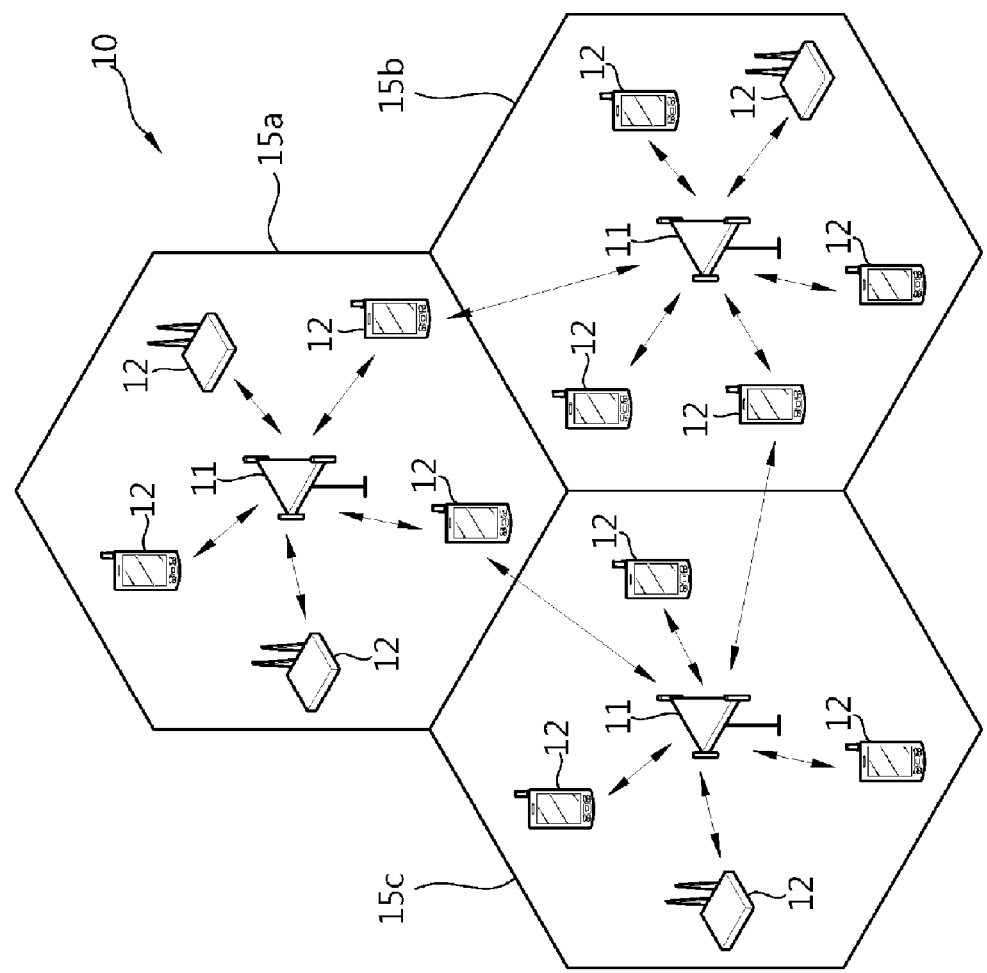
FIG. 1 shows a wireless communication system.

FIG. 1 shows a wireless communication system.

Referring to FIG. 1, a wireless communication system 10 includes at least one base station (BS) 11. The BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Hereinafter, a downlink (DL) denotes a communication link from the BS to the UE, and an uplink (UL) denotes a communication link from the UE to the BS. In the DL, a transmitter may be a part of the BS, and a receiver may be a part of the UE. In the UL, the transmitter may be a part of the UE, and the receiver may be a part of the BS.

Figure 2:
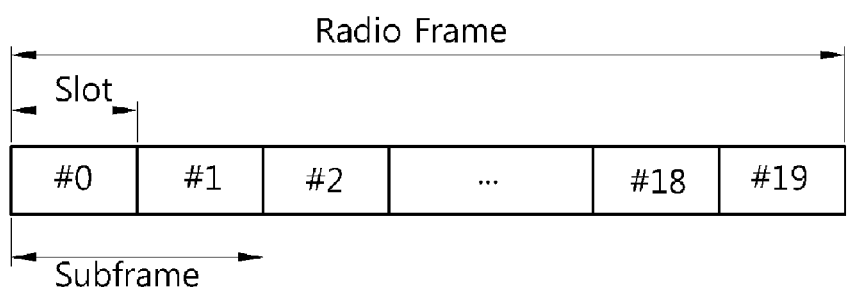
FIG. 2 shows an exemplary structure of a radio frame in 3GPP LTE.

FIG. 2 shows an exemplary structure of a radio frame in 3GPP LTE.

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is only illustrative, and the number of subframes included in the radio frame, the number of slots included in the subframe, etc. may be changed in various ways.

Figure 3:
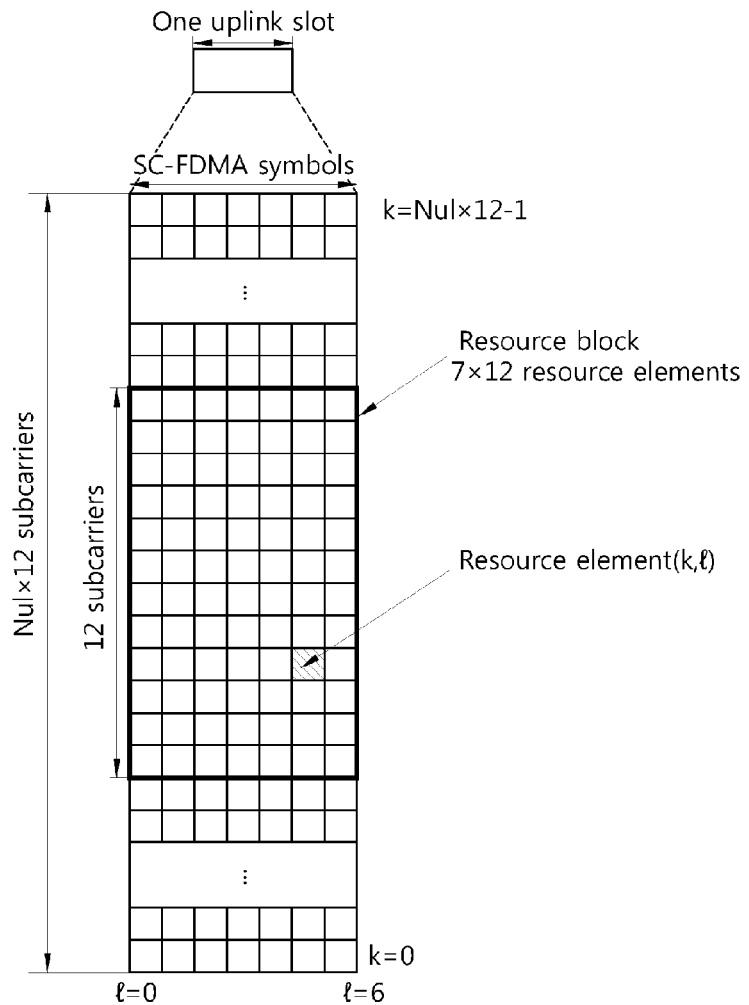
FIG. 3 shows an exemplary resource grid for one uplink slot in 3GPP LTE.

FIG. 3 shows an exemplary resource grid for one uplink slot in 3GPP LTE.

Referring to FIG. 3, the uplink slot includes a plurality of SC-FDMA symbols in the time domain and a $N^{UL}$ resource block (RB) in the frequency domain. The SC-FDMA symbol is used to express one symbol period and may be called an OFDMA symbol or a symbol period depending on the system. The resource block is a resource allocation unit and includes a plurality of subcarriers in the frequency domain. The number of resource blocks $N^{UL}$, included in an uplink slot, depends on a uplink transmission bandwidth configured in a cell. The uplink transmission bandwidth is system information. A UE can know $N^{UL}$ by acquiring system information.

Each of elements on the resource grid is called a resource element. The resource element on the resource grid can be identified through an index pair (k, l) in a slot. Here, k (k= 0, . . . , $N^{UL} \times 12 - 1$) denotes a subcarrier index in the frequency domain, and l (l=0, . . . , 6) denotes an SC-FDMA symbol index in the time domain.

Here, one resource block is illustrated to include 7×12 resource elements (7 SC-FDMA symbols in the time domain and 12 subcarriers in the frequency domain). However, the number of SC-FDMA symbols and the number of subcarriers within a resource block are not limited to the 7×12 resource elements. The number of SC-FDMA symbols or the number of subcarriers included in a resource block may be changed in various ways. The number of SC-FDMA symbols may be changed depending on the length of a Cyclic Prefix (CP). For example, the number of SC-FDMA symbols in a normal CP is 7, and the number of SC-FDMA symbols in an extended CP is 6.

The resource grid for one uplink slot in 3GPP LTE shown in FIG. 3 may also be applied to a resource grid for a downlink slot. The downlink slot, however, includes a plurality of orthogonal frequency division multiplexing (OFDM) symbols in the time domain.

Figure 4:
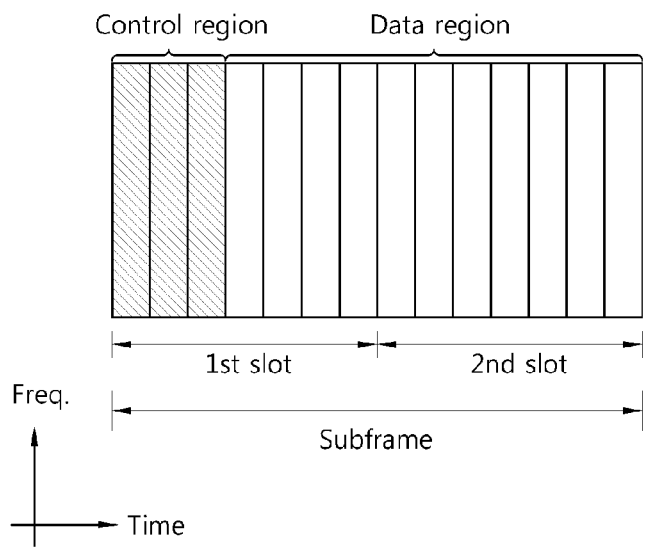
FIG. 4 shows an exemplary structure of a downlink subframe in 3GPP LTE.

FIG. 4 shows an exemplary structure of a downlink subframe in 3GPP LTE.

Referring to FIG. 4, the downlink subframe includes two consecutive slots. Three foremost OFDM symbols of a first slot in the downlink subframe refer to a control region to which a Physical Downlink Control Channel (PDCCH) is allocated, and the remaining OFDM symbols refer to a data region to which a Physical Downlink Shared Channel (PDSCH) is allocated. Control channels, such as a Physical Control Format Indicator Channel (PCFICH) and a Physical Hybrid-ARQ Indicator Channel (PHICH), other than the PDCCH may also be allocated to the control region. Here, the control region is illustrated to include the three OFDM symbols, but this is only illustrative. The number of OFDM symbols included in a control region in a subframe can be known by a PCFICH. The PHICH carries Hybrid Automatic Repeat Request (HARQ) ACK (acknowledgement)/NACK (not-acknowledgement) information in response to uplink data transmission.

The PDCCH may carry a downlink grant, informing resource allocation for downlink transmission on the PDSCH. A UE may read downlink user data, transmitted on the PDSCH, by decoding control information transmitted on the PDCCH. Further, the PDCCH may carry control information, used for scheduling of Physical Uplink Shared Channel (PUSCH), to a UE. The control information used for scheduling of PUSCH is an uplink grant, informing resource allocation for uplink transmission.

The control region includes a set of a plurality of Control Channel Elements (CCEs). The PDCCH is transmitted on an aggregations of one or several consecutive CCEs.

A CCE corresponds to a plurality of resource element groups. The resource element group is used to define the mapping of control channel to a resource element. When the total number of CCEs is Ncce in a downlink subframe, the CCEs are assigned CCE indices from 0 to Ncce-1. Since the number of OFDM symbols included in a control region in a subframe may change every subframe, the total number of CCEs in the subframe may also change every subframe.

Figure 5:
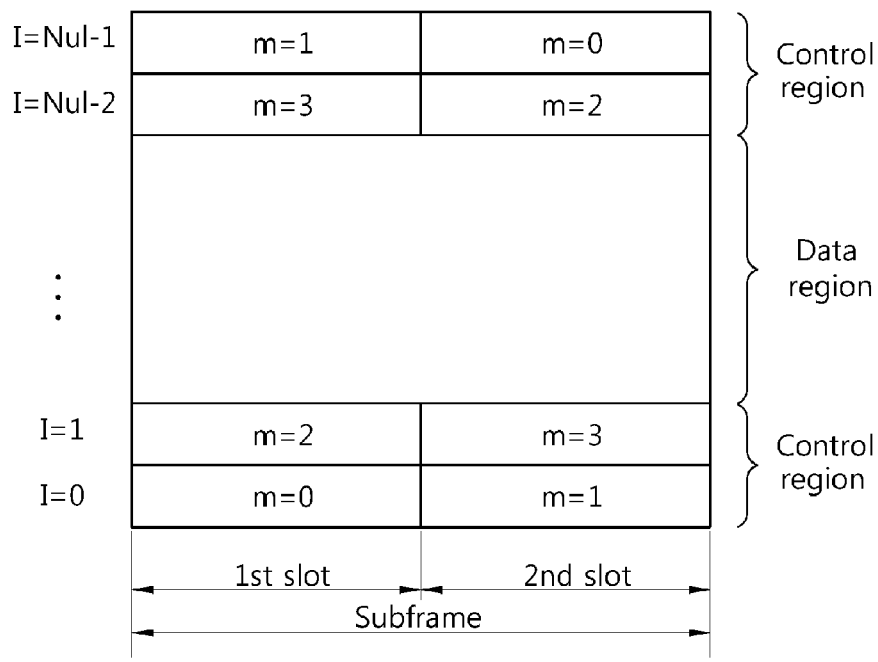
FIG. 5 shows an exemplary structure of an uplink subframe in 3GPP LTE.

FIG. 5 shows an exemplary structure of an uplink subframe in 3GPP LTE.

Referring to FIG. 5, the uplink subframe may be divided into a control region in which a Physical Uplink Control Channel (PUCCH) carrying uplink control information is allocated and a data region in which a Physical Uplink Shared Channel (PUSCH) carrying uplink data is allocated. In order to maintain a single carrier property in SC-FDMA, resource blocks contiguous in the frequency domain are allocated to one UE. A single UE cannot transmit the PUCCH and the PUSCH at the same time.

I (I=0, ..., Nul-1) is a resource block index indicating the position of a resource block in the frequency domain. The resource block index increases in ascending powers according to a frequency sequence. In the case where one resource block includes 12 subcarriers in the frequency domain, the resource block index may be expressed by the following equation.

MathFigure 1

$$I = \left\lfloor \frac{k}{12} \right\rfloor \quad [\text{Math. 1}]$$

Here, k is a subcarrier index in the frequency domain (k= 0, ..., Nul×12-1).

A PUCCH for one UE is allocated in the form of a control channel resource block pair (RB pair) in a subframe. Resource blocks included in a control channel resource block pair occupy different subcarriers in a first slot and a second slot. It is said that the control channel resource block pair is subject to frequency hopping at the slot boundary. A frequency diversity gain can be obtained by transmitting one control channel for a UE through different subcarriers according to time.

'm' is a control channel index indicating the logical frequency domain position of a control channel resource block pair in a subframe. A relationship between the resource block index I and the control channel index m may be expressed by the following equation.

MathFigure 2

$$I = \begin{cases} \left\lfloor \frac{m}{2} \right\rfloor & \text{if } (m + Ns\bmod 2)\bmod 2 = 0 \\ Nul - 1 - \left\lfloor \frac{m}{2} \right\rfloor & \text{if } (m + Ns\bmod 2)\bmod 2 = 1 \end{cases} \quad [\text{Math. 2}]$$

Here, Ns is a slot number in a radio frame. For example, a case where a control channel resource block pair having a control channel index m=1 is allocated to a UE is described below. The UE transmits control information through a resource block corresponding to a resource block index I=Nul-1 in a first slot and a resource block corresponding to a resource block index I=0 in a second slot, in a subframe.

The control information is transmitted in a control region, and uplink data is transmitted in a data region. In the case where the UE transmits only the control information, a radio resource in the control region may be allocated to the UE. In the case where the UE transmits the uplink data, a radio resource in the data region may be allocated to the UE. As an exceptional case, in the case where the amount of control information to be transmitted is large or control information is not suitable for transmission through a control region, a UE may transmit only the control information using the radio resource allocated in the data region.

A method of allocating resources for control information in a control region and a method of allocating resources for uplink data in a data region may differ. A method of transmitting control information in a control region and a method of transmitting uplink data in a data region may also differ. Here, the transmission method may refer to a modulation method, a channel coding method, or a mapping method in a resource element.

A control region and a data region use different resource blocks or different subcarriers in a subframe. In other words, the control region and the data region use different frequency domains. The control region may be placed at both edges of an uplink transmission bandwidth, and the data region may be placed at the central portion of the uplink transmission bandwidth. However, the example is only illustrative, and the positions of a control region and a data region in a subframe are not limited to the above positions. The positions of a control region and a data region in a subframe may be changed and are not limited to the positions shown in the drawings.

Figure 6:
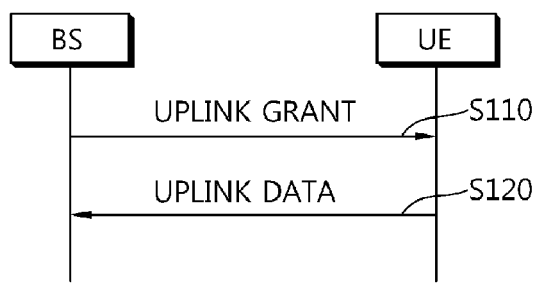
FIG. 6 is a flowchart showing an example of a method of transmitting uplink data.

FIG. 6 is a flowchart showing an example of a method of transmitting uplink data.

Referring to FIG. 6, a BS transmits an uplink grant to a UE at step S110. The UE transmits uplink data to the BS using the uplink grant at step S120. The uplink grant may be transmitted on the PDCCH, and the uplink data may be transmitted on the PUSCH. A relationship between a subframe in which a PDCCH is transmitted and a subframe in which a PUSCH is transmitted may be previously set between the BS and the UE. For example, if the PDCCH is transmitted in an nth subframe in a Frequency Division Duplex (FDD) system, the PUSCH may be transmitted in an (n+4)th subframe.

The uplink grant is control information for uplink data scheduling. The uplink data may be a transport block which is a data block for an uplink-Shared Channel (UL-SCH) and is transmitted during a TTI. The transport block may be user data. The PUSCH is mapped to the UL-SCH which is a transport channel. Alternatively, the uplink data may be multiplexed data. The multiplexed data may be the result of multiplexing the transport block for the uplink-SCH and the control information. For example, the control information may include CQI, Precoding Matrix Indicator (PMI), HARQ ACK/NACK, and Rank Indicator (RI). Alternatively, the uplink data may include only control information.

The uplink grant includes a resource allocation field. The resource allocation field indicates a radio resource for the transmission of uplink data. The radio resource may be a time-frequency resource. A radio resource allocated by a resource allocation field in 3GPP LTE is a resource block. The resource allocation field may include the number of resource blocks allocated and a resource block index corresponding to a starting resource block. Alternatively, the resource allocation field may include only a resource block index. A UE may know the position of a resource block allocated for the transmission of uplink data, the number of resource blocks, and so on based on the resource allocation field.

The uplink grant may include a hopping flag, indicating whether frequency hopping in the data region of a subframe is being performed. If the hopping flag does not indicate hopping, a resource block indicated by resource allocation fields both in a first slot and a second slot in the subframe is allocated to a UE. If the hopping flag indicates hopping, the UE transmits uplink data through a resource block indicated by a resource allocation field in the first slot of the subframe. The UE also transmits uplink data through a resource block which has been frequency-hopped in the data region from the resource block in the second slot of the subframe.

The uplink grant may further include a flag distinguishing an uplink grant and another control information, a transport format field indicating a transport format for uplink data, a New Data Indicator (NDI) indicating whether an uplink grant is for the transmission of new uplink data or the retransmission of uplink data, a Transmit Power Control (TPC) command field for uplink power control, a cyclic shift field indicating the cyclic shift of a reference signal for demodulation, a Channel Quality Indicator (CQI) request indicator indicating whether a CQI has been requested, and the like.

Figure 7:
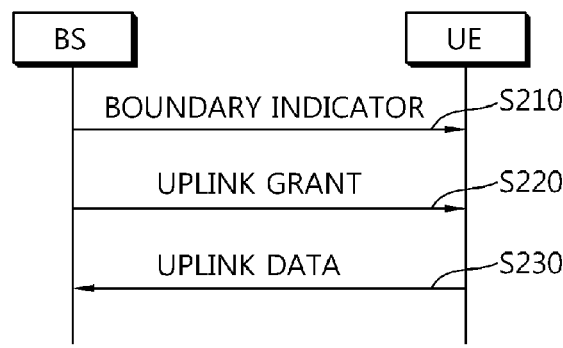
FIG. 7 is a flowchart showing another example of a method of transmitting uplink data.

FIG. 7 is a flowchart showing another example of a method of transmitting uplink data.

Referring to FIG. 7, a BS transmits a boundary indicator to a UE at step S210. The BS transmits an uplink grant to the UE at step S220. The UE transmits uplink data to the BS using the uplink grant at step S230.

Both the BS and the UE must know the boundary of a control region and a data region in a subframe. The boundary indicator is used for the BS to indicate to the UE the boundary between the control region and the data region in the subframe. The boundary indicator may inform the boundary directly or indirectly. The boundary between the control region and the data region in the subframe may be set semi-statically through the boundary indicator. The boundary indicator may be set by a higher layer of the physical layer. The higher layer may be Radio Resource Controller (RRC) which functions to control radio resources between a UE and a network.

For example, the boundary indicator may indicate a Sounding Reference Signal (SRS) bandwidth. The SRS is a reference signal which is transmitted from a UE to a BS for uplink scheduling. The BS estimates an uplink channel based on the SRS and uses the estimated uplink channel for uplink scheduling. The UE may know the boundary between a control region and a data region in a subframe based on the SRS bandwidth. FIG. 5 corresponds to a case where a boundary indicator indicates Nul–4 resource blocks based on an SRS bandwidth.

As another example, the boundary indicator may also indicate the number of resource blocks used for a control region in a single slot. A UE may know the boundary between a control region and a data region in a subframe based on the number of resource blocks. FIG. 5 corresponds to a case where a boundary indicator indicates four resource blocks (m=0, 1, 2, 3).

If the boundary indicator is not transmitted, the boundary between the control region and the data region in the subframe may be decided in accordance with rules previously agreed between the BS and the UE. For example, the boundary may be decided based on an uplink transmission bandwidth configured in a cell. In this case, if a UE knows an uplink transmission bandwidth by acquiring system information, the UE may know the boundary.

Figure 8:
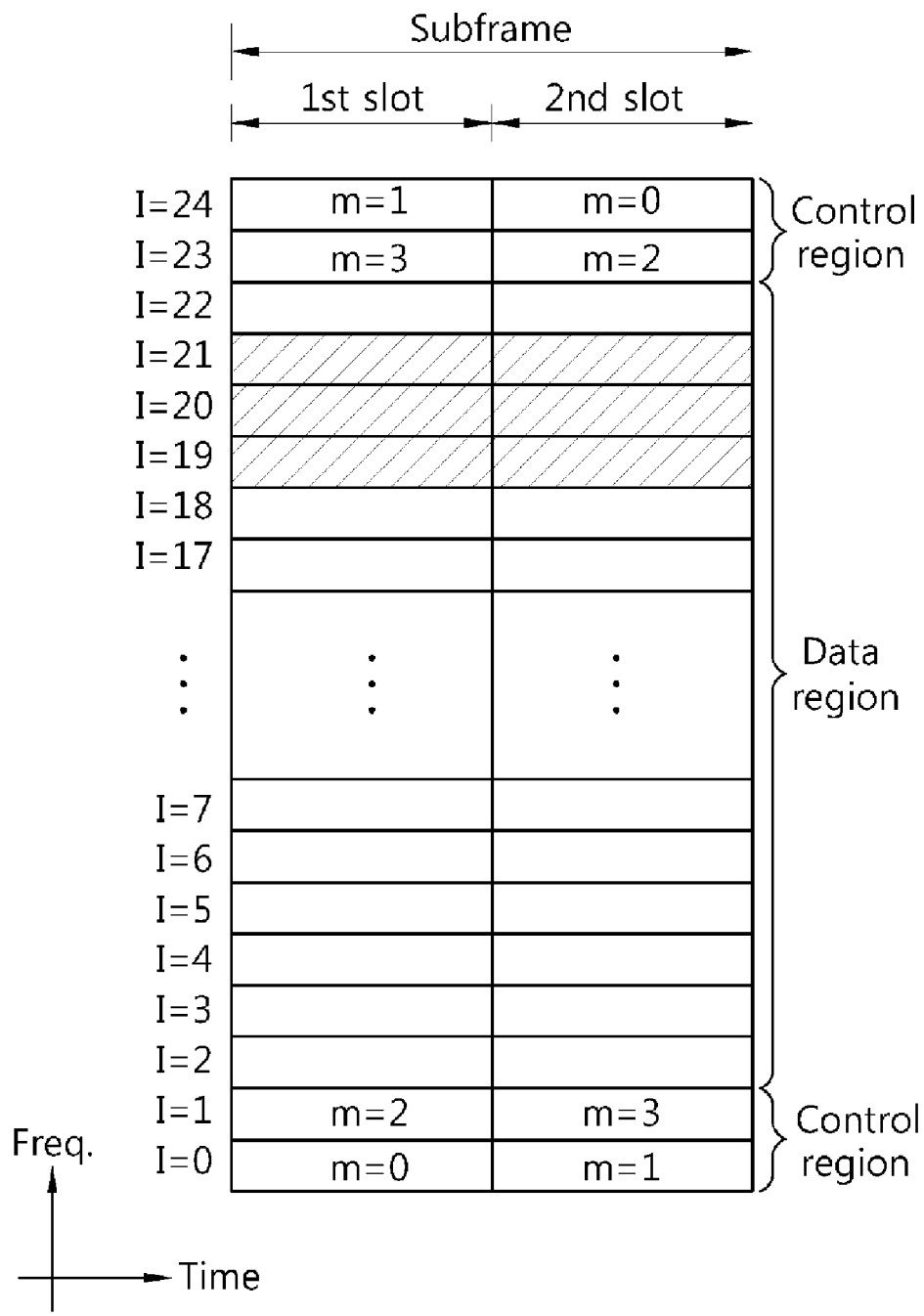
FIG. 8 shows an example of resource blocks allocated to a user equipment (UE) for the transmission of uplink data in a subframe.

FIG. 8 shows an example of resource blocks allocated to a UE for the transmission of uplink data in a subframe.

Referring to FIG. 8, a subframe includes a total of 25 resource blocks in a frequency domain. The resource blocks may be assigned resource block indices 0 to 24. Resource blocks corresponding to respective resource block indices I=19 to 21 both in a first slot and a second slot are allocated to the UE through an uplink grant. In this case, a resource allocation field of the uplink grant may indicate I=19 (i.e., a resource block index corresponding to a starting resource block) and may indicate 3 (i.e., the number of resource blocks allocated). A hopping flag of the uplink grant may not indicate frequency hopping. All the resource blocks allocated to the UE are resource blocks belonging to a data region. The UE may transmit reference signals for demodulating uplink data in the allocated resource blocks. The reference signals are known by both the UE and a BS for channel estimation.

Figure 9:
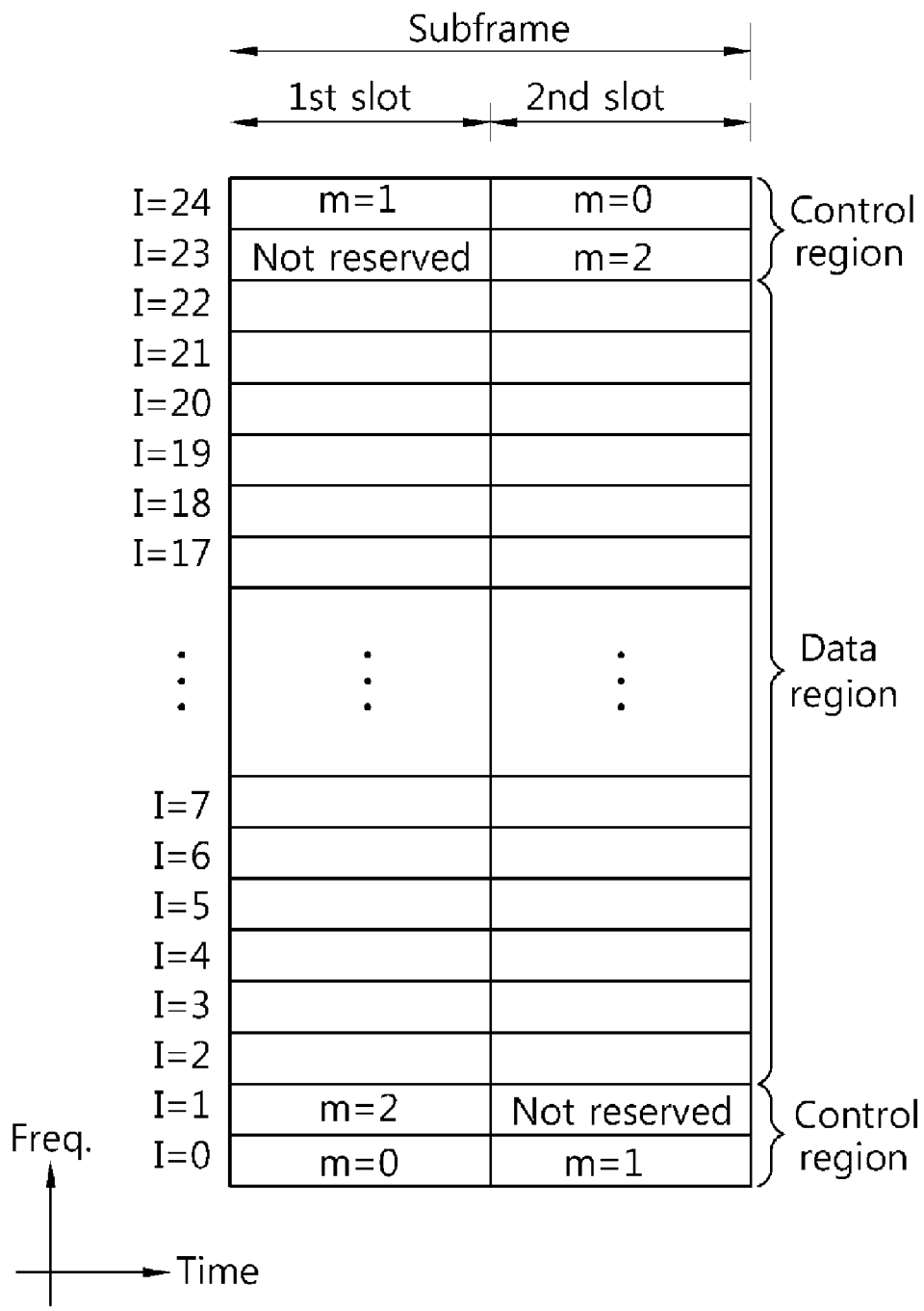
FIG. 9 shows an example of resource blocks allocated for the transmission of control information in a subframe.

FIG. 9 shows an example of resource blocks allocated for the transmission of control information in a subframe.

Referring to FIG. 9, only three control channel resource block pairs (m=0, 1, 2) in a subframe are reserved for the transmission of control information, and the remaining one control channel resource block pair (m=3) in a control region is not reserved for the transmission of control information. In the subframe, the three control channel resource block pairs (m=0, 1, 2) may be used to transmit control information, and the control channel resource block pair (m=3) not reserved for the transmission of control information is not used to transmit control information. If a boundary indicator indicates the number of resource blocks used for a control region in one slot, it corresponds to a case where the boundary indicator indicates three resource blocks (m=0, 1, 2).

The control information may include HARQ ACK/NACK, a CQI indicating a downlink channel state, a Scheduling Request (SR) requesting an uplink radio resource allocation, and so on.

Different UEs within a cell may transmit respective control information to a BS at different points of time. Otherwise, different UEs within a cell may transmit respective control information to a BS at the same time. In this case, if the UEs use different control channel resources, the BS may distinguish the control information transmitted by the respective UEs. The control channel resources are used to transmit control information on a control channel. The control channel resources may include a frequency, a sequence used to transmit control information, etc. The frequency which is one of the control channel resources may be a control channel resource block pair. The same control channel resource block pair in a subframe may be allocated to a plurality of UEs within a cell. Here, if the plurality of UEs uses different sequences for the transmission of control information, a BS may distinguish the control information transmitted by the plurality of respective UEs.

The control channel resource is identified by a control channel resource index. A BS may inform each UE of a control channel resource index for other control information except for HARQ ACK/NACK. The control channel resource index may be set by a higher layer, such as an RRC. A control channel resource index when control information is the HARQ ACK/NACK is referred to as an ACK/NACK resource index. The ACK/NACK resource index may be obtained from a radio resource through which a downlink control channel for receiving downlink data, corresponding to the HARQ ACK/NACK, is transmitted. For example, the downlink data may be received on a PDSCH, the downlink control channel may be a PDCCH used to schedule the PDSCH, and the radio resource may be a first CCE index used to transmit the PDCCH. However, the total number of CCEs in a subframe may vary depending on the subframe. Accordingly, a control channel resource block pair reserved for the transmission of control information in a subframe may not be used for the transmission of control information in a specific subframe.

Further, in the case where an odd number of control channel resource block pairs in a subframe are reserved for the transmission of control information, a single control channel resource block pair in a control region remains intact without being reserved for the transmission of control information.

However, a resource block not used for the transmission of control information in the control region of a subframe wastes limited radio resources. One resource block may include 6×12=72 resource elements other than a resource element to which a reference signal is mapped. One modulation symbol may be mapped to one resource element. If a modulation method is Quadrature Phase Shift Keying (QPSK), 144-bit data may be transmitted every resource block. Accordingly, in order to efficiently use limited radio resources, a resource block not used for the transmission of control information in a control region needs to be used for the transmission of uplink data. In the case where a resource block belonging to a control region in a subframe is not used for the transmission of control information by any UE within a cell, a BS may allocate the resource block to one UE within the cell for the transmission of uplink data through scheduling. The corresponding UE may transmit uplink data to the BS using the allocated resource block.

Figure 10:
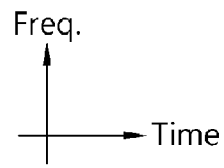
FIG. 10 shows a first example of resource blocks which are allocated for the transmission of uplink data in a control region of a subframe.

FIG. 10 shows a first example of resource blocks which are allocated for the *transmission of uplink data in a control region of a subframe*.

Referring to FIG. 10, resource blocks in a slot may be assigned resource block indices (I) in ascending powers in accordance with a frequency sequence. Resource blocks in a slot may also be assigned reverse resource block indices (Irev) in an opposite direction to the resource block indices (I). The resource block index (I) and the reverse resource block index (Irev) have the following equation relationship.

MathFigure 3

$$Irev = Nul - I - 1 \qquad \text{[Math.3]}$$

Here, Nul indicates the number of resource blocks included in an uplink slot.

A resource block may correspond to the resource block index (I) or the reverse resource block index (Irev) depending on whether the resource block belongs to a first slot or a second slot or whether the resource block belongs to a data region or a control region. The reverse resource block index may be used only in a resource block belonging to the control region of a second slot. That is, a resource block belonging to a first slot and a resource block belonging to the data region of the second slot correspond to the resource block indices (I).

For example, a case where a BS instructs a UE on a resource block index 20 through the resource allocation field of an uplink grant is described below. In a first slot, a resource block corresponding to the resource block index 20 belongs to a data region. In this case, the UE may know whether the resource block index, indicated by the resource allocation field, belongs to the data region or a control region based on a boundary indicator. The UE may determine that a resource block belonging to the data region has been allocated by the BS for the transmission of uplink data. The UE searches the second slot for a resource block corresponding to the resource block index 20. Accordingly, the UE uses resource blocks, corresponding to the resource block index 20 both in the first slot and the second slot, for the transmission of uplink data. A hopping flag of the uplink grant may not indicate frequency hopping.

As another example, a case where a BS instructs a UE on a resource block index 1 through the resource allocation field of an uplink grant is described below. In a first slot, a resource block corresponding to the resource block index 1 belongs to a control region. The UE may determine that a resource block belonging to the control region has been allocated by the BS for the transmission of uplink data. The UE searches a second slot for a resource block corresponding to a reverse resource block index 1. Accordingly, the UE uses a resource block, corresponding to the resource block index 1 in the first slot, and a resource block, corresponding to the reverse resource block index 1 in the second slot, for the transmission of uplink data. A hopping flag of the uplink grant may not indicate frequency hopping.

When, as described above, a resource block belonging to the control region of a second slot is made to correspond to a reverse resource block index, a control channel resource block pair in the control region may be allocated to a UE for the transmission of uplink data without additional signaling.

In the case where a control channel resource block pair in a control region is not used for the transmission of control information, however, a BS may schedule the resource blocks of the control channel resource block pair for respective different UEs as respective resource blocks for the transmission of uplink data.

Figure 11:
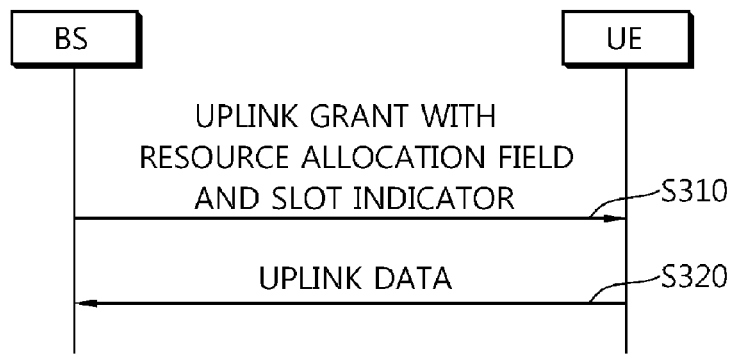
FIG. 11 is a flowchart showing a method of transmitting uplink data through resource blocks in a control region according to an embodiment of the present invention.

FIG. 11 is a flowchart showing a method of transmitting uplink data through resource blocks in a control region according to an embodiment of the present invention.

Referring to FIG. 11, a BS transmits to a UE an uplink grant including a resource allocation field and a slot indicator at step S310. The UE transmits uplink data to the BS using the uplink grant at step S320.

The resource allocation field includes a resource block index, indicating a resource block selected from among a plurality of resource blocks belonging to the control region of a subframe. The slot indicator indicates one of the two slots in a subframe. The slot indicator may be newly added to an uplink grant. Alternatively, the slot indicator may use a filed previously included in an uplink grant. For example, a hopping flag may be used as a slot indicator. In this case, the hopping flag may be differently interpreted depending on whether a resource block indicated by a resource allocation field belongs to a data region or a control region. In the case where the resource block indicated by the resource allocation field belongs to the data region, the hopping flag indicates whether frequency hopping in the data region is being performed. In the case where the resource block indicated by the resource allocation field belongs to the control region, the hopping flag becomes the slot indicator.

The following table shows an example of meanings depending on the value of a slot indicator (Is) when the size of the slot indicator is 1 bit.

TABLE 1

| Slot indicator | Description |
| --- | --- |
| 0(OFF) | 1st slot |
| 1(ON) | 2nd slot |

Here, when the slot indicator is 0(OFF), the first slot is indicated. When the slot indicator is 1(ON), the second slot is indicated. However, the above table is only illustrative, and the slots indicated by ON and OFF may be exchanged.

The UE that has received the uplink grant determines whether the resource block indicated by the resource allocation field belongs to the data region or the control region. If, as a result of the determination, the resource block indicated by the resource allocation field is determined to belong to the control region, the UE checks which one of the two slots of the subframe is indicated by the slot indicator. The UE transmits the uplink data through a resource block, indicated by the resource block index included in the resource allocation field in a slot indicated by the slot indicator. For convenience of description, the resource block is hereinafter referred to a first resource block. Further, a resource block indicated by a resource block index, included in a resource allocation field in a slot not indicated by a slot indicator, is referred to as a second resource block. Any UE within a cell may not transmit control information through the first resource block in the subframe. The control information of other UE within a cell may be transmitted through the second resource block in the subframe.

Figure 12:
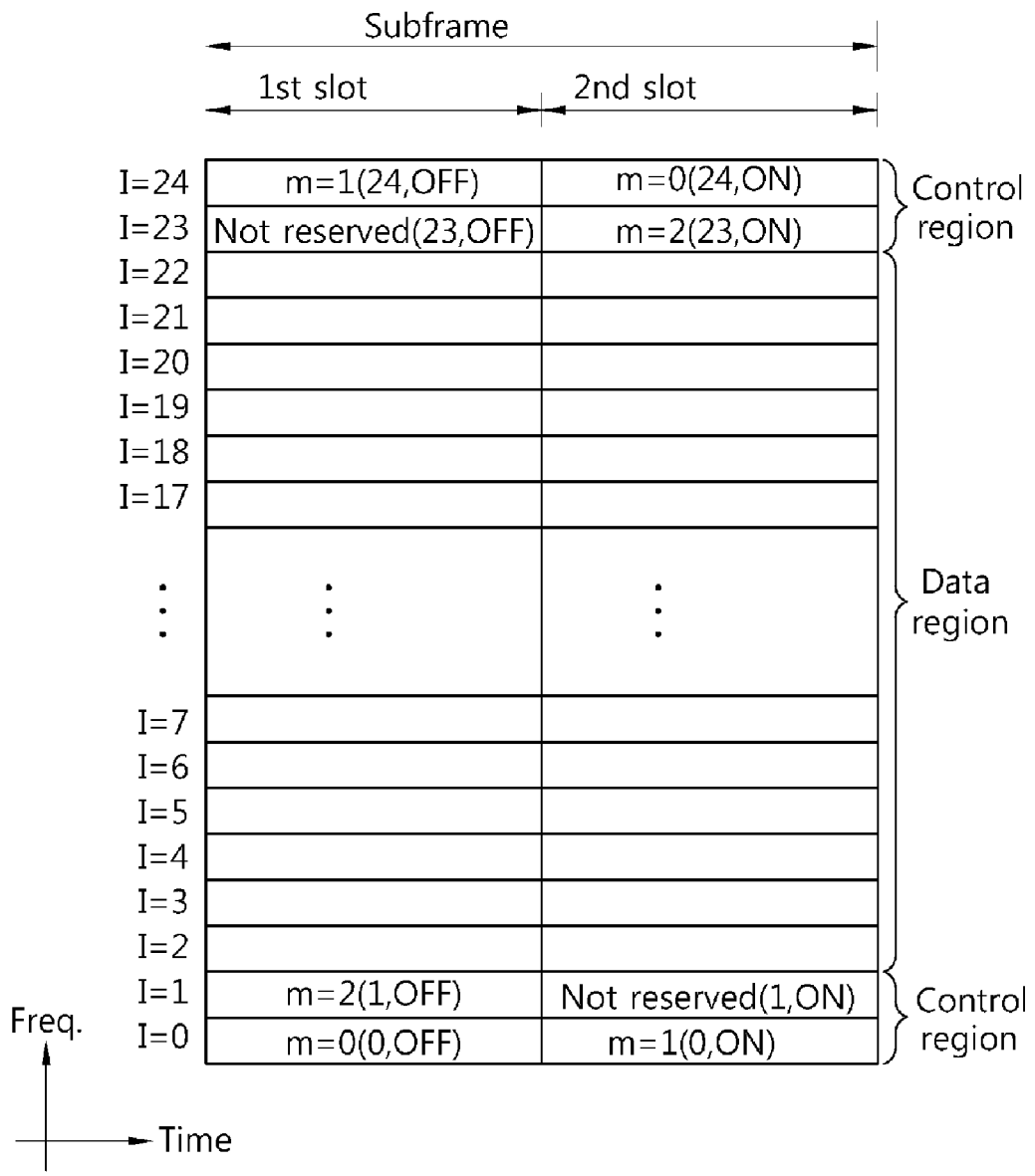
FIG. 12 shows a second example of resource blocks which are allocated for the transmission of uplink data in a control region of a subframe.

FIG. 12 shows a second example of resource blocks which are allocated for the transmission of uplink data in a control region of a subframe.

Referring to FIG. 12, a BS transmits to a UE an uplink grant (I, Is) including a resource block index (I) and a slot indicator (Is).

For example, when the UE receives an uplink grant (23, ON), the UE transmits uplink data using only a resource block corresponding to the resource block index 23 of a second slot in a subframe. Here, the control information of other UE may be transmitted through a resource block corresponding to the resource block index 23 of a first slot in the subframe.

As another example, when the UE receives an uplink grant (1, OFF), the UE transmits uplink data using only a resource block corresponding to the resource block index 1 of the first slot in the subframe.

As described above, a BS may allocate only the resource block of one of the two slots in a control region using an uplink grant for the transmission of uplink data. In this case, uplink data can be transmitted using only half resource regions as compared with a case where resource blocks in a data region are allocated through an uplink grant.

In the case where a UE transmits uplink data using only one of the two slots in a subframe, a method of processing the uplink data may include the following two kinds of methods. In the first method, modulation symbols for uplink data are sequentially mapped from the resource blocks of a first slot to the resource blocks of a second slot. If the modulation symbols have all been mapped, the resource blocks of a slot which has not been allocated are punctured. In the second method, modulation symbols for uplink data are mapped to only resource blocks of one of the two slots, which has been allocated.

Figure 13:
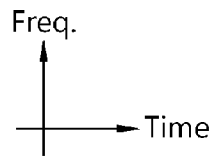
FIG. 13 shows a third example of resource blocks which are allocated for the transmission of uplink data in a control region of a subframe.

FIG. 13 shows a third example of resource blocks which are allocated for the transmission of uplink data in a control region of a subframe.

Referring to FIG. 13, an uplink grant transmitted by a BS includes a resource allocation field and a slot indicator. Here, when the slot indicator indicates a second slot and a resource block index, included in the resource allocation field, indicates the resource block of a control region, the resource block index is interpreted as a reverse resource block index.

A UE that has received an uplink grant determines whether a resource block allocated through a resource allocation field belongs to a data region or a control region. If, as a result of the determination, the allocated resource block is determined to belong to the control region, the UE determines which one of the two slots in a subframe is indicated by a slot indicator. If, as a result of the determination, the first slot is determined to be indicated by the slot indicator, a resource block corresponding to a resource block index is allocated to the UE. The UE transmits uplink data through the resource block in the first slot, indicated by the resource block index. If, as a result of the determination, however, the second slot is determined to be indicated by the slot indicator, a resource block corresponding to a reverse resource block index is allocated to the UE. The UE transmits uplink data through the resource block in the second slot, indicated by the reverse resource block index.

For example, when a UE receives an uplink grant (23, ON), the UE transmits uplink data through a resource block corresponding to the reverse resource block index 23 of a second slot in a subframe. In other words, the UE transmits uplink data using only a resource block corresponding to the resource block index 1 of the second slot.

As another example, when a UE receives an uplink grant (23, OFF), the UE transmits uplink data using only a resource block corresponding to the resource block index 23 of a first slot in a subframe.

Figure 14:
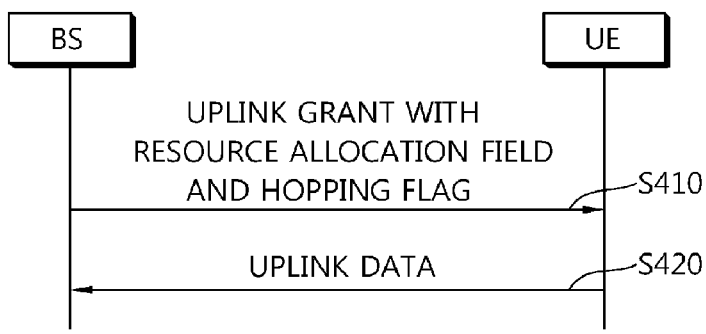
FIG. 14 is a flowchart showing still another example of a method of transmitting uplink data.

FIG. 14 is a flowchart showing still another example of a method of transmitting uplink data.

Referring to FIG. 14, a BS transmits to a UE an uplink grant including a resource allocation field and a hopping flag at step S410. The UE transmits uplink data to the BS using the uplink grant at step S420.

The hopping flag may be differently interpreted depending on whether a resource block indicated by a resource allocation field belongs to a data region or a control region. If the resource block belongs to the control region, the hopping flag may indicate whether frequency hopping in the control region is being performed. It is, hereinafter, assumed that a resource block indicated by a resource allocation field belongs to a control region. If a hopping flag does not indicate hopping, resource blocks indicated by a resource allocation field both in a first slot and a second slot in a subframe are allocated to a UE. If a hopping flag indicates hopping, a UE transmits uplink data through a first resource block indicated by a resource allocation field in a first slot in a subframe. Further, a UE transmits uplink data through a second resource block which is a control channel resource block pair with the first resource block in the second slot in the subframe. That is, if the hopping flag indicates hopping, the UE complies with a pattern in which the control channel resource block pair is frequency-hopped.

Figure 15:
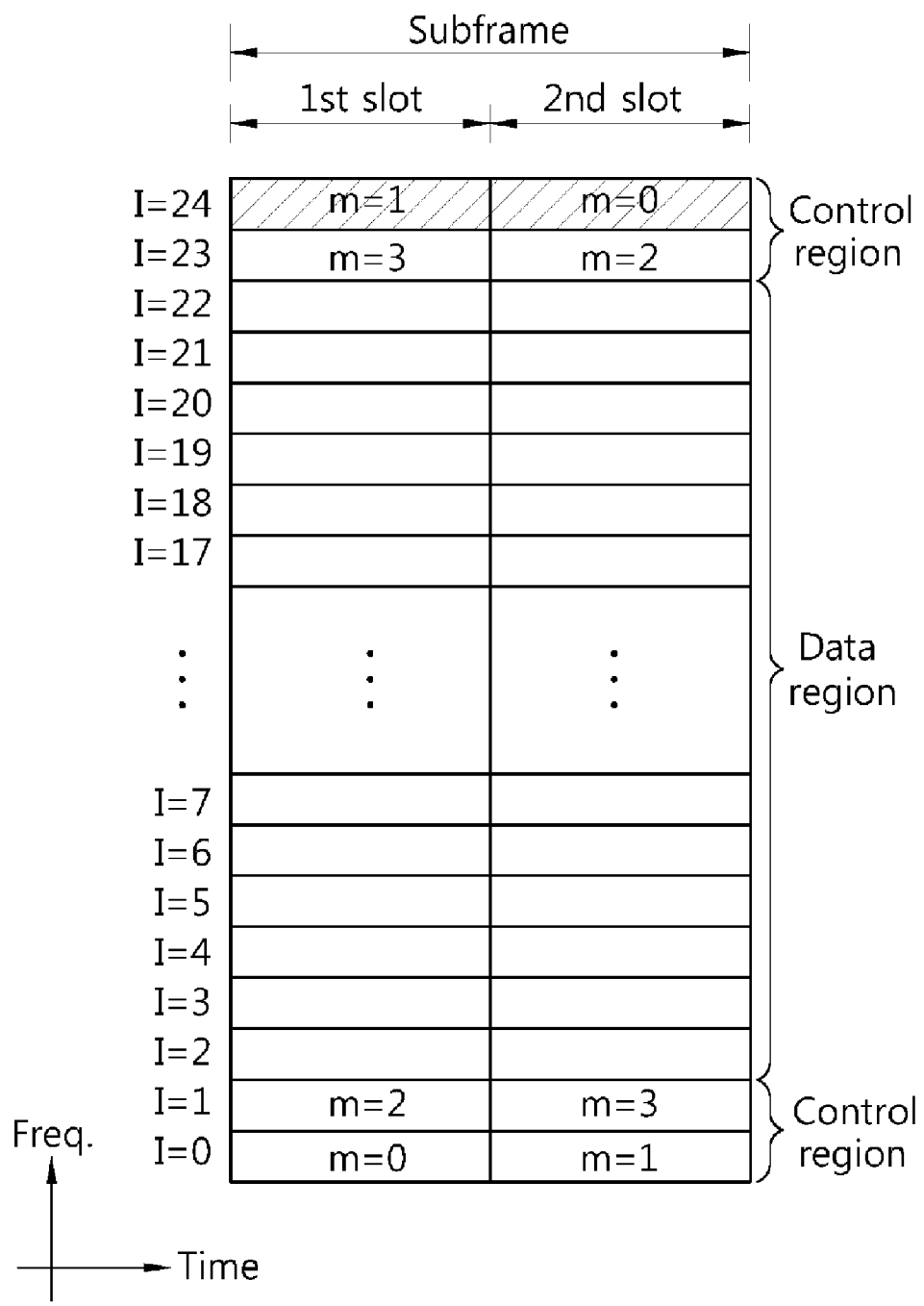
FIG. 15 shows a fourth example of resource blocks which are allocated for the transmission of uplink data in a control region of a subframe.

FIG. 15 shows a fourth example of resource blocks which are allocated for the transmission of uplink data in a control region of a subframe. This corresponds to a case where a BS instructs a UE on a resource block index 24 through the resource allocation field of an uplink grant and does not instruct the UE on hopping through a hopping flag. Resource blocks, corresponding to the resource block index 24 both in a first slot and a second slot in a subframe, are allocated to the UE.

Figure 16:
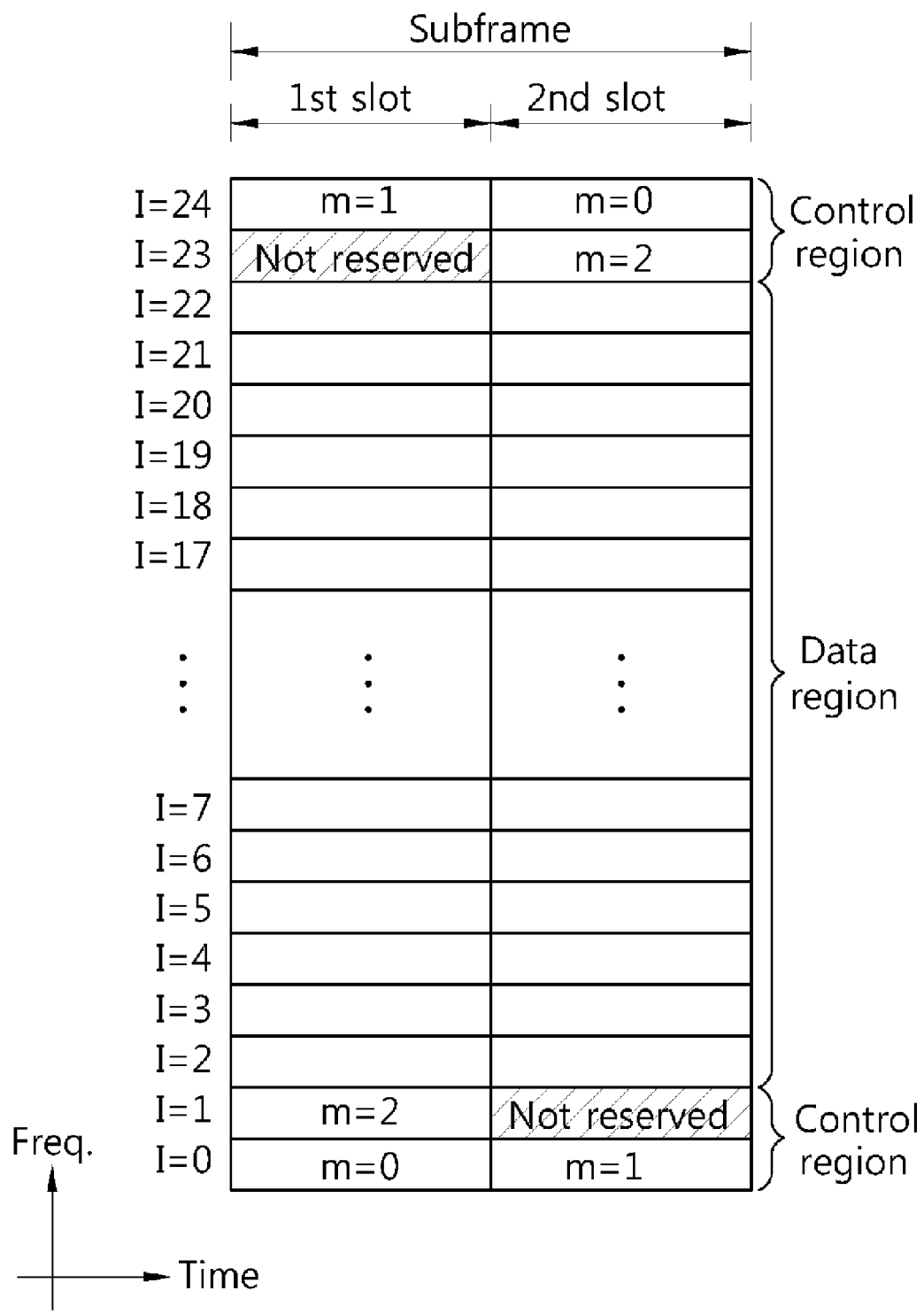
FIG. 16 shows a fifth example of resource blocks which are allocated for the transmission of uplink data in a control region of a subframe.

FIG. 16 shows a fifth example of resource blocks which are allocated for the transmission of uplink data in a control region of a subframe. This corresponds to a case where a BS instructs a UE on a resource block index 23 through the resource allocation field of an uplink grant and instructs the UE on hopping through a hopping flag. A resource block corresponding to the resource block index 23 of a first slot in a subframe is allocated to the UE. The resource block index 23 of the first slot is a control channel resource block pair with the resource block index 1 of a second slot. Accordingly, a resource block, corresponding to the resource block index 1 of the second slot in the subframe, is allocated to the UE.

The cases where the number of resource blocks allocated through the resource allocation field of an uplink grant is one have so far been described. However, the number of resource blocks allocated may be one or more. In the case where a plurality of resource blocks is allocated, some of the plurality of resource blocks may belong to a data region and the remaining resource blocks may belong to a control region. In this case, a BS is required to indicate whether all the resource blocks of the control region have been allocated to two slots in a subframe or to only one of the first and second slots.

Figure 17:
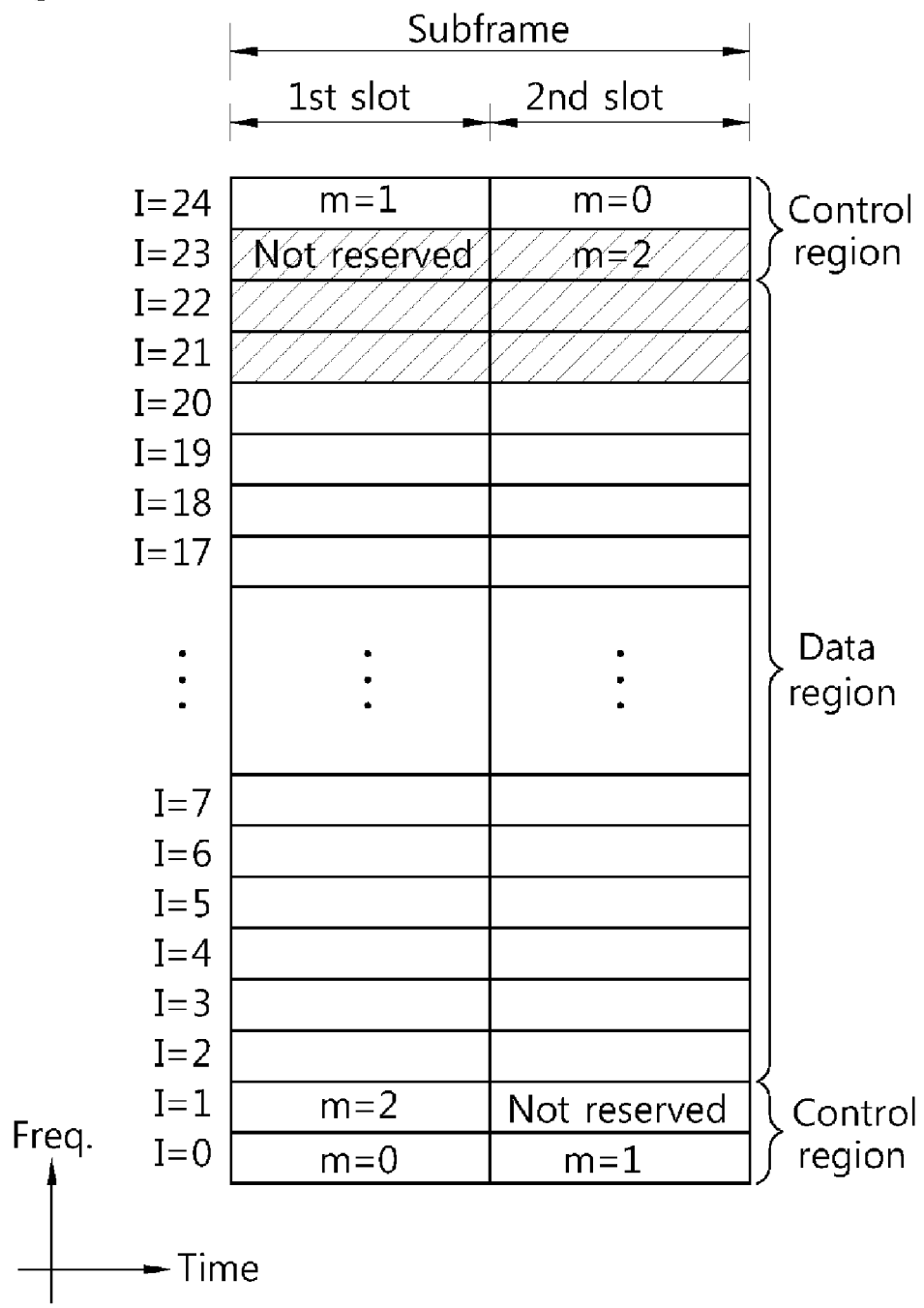
FIG. 17 shows an example in which resource blocks for the transmission of uplink data are allocated in a control region and a data region.

FIG. 17 shows an example in which resource blocks for the transmission of uplink data are allocated in a control region and a data region.

Referring to FIG. 17, resource blocks corresponding to respective resource block indices I=21 to 23 are allocated to a UE through an uplink grant. In this case, a resource allocation field of the uplink grant may indicate I=21 as a resource block index, corresponding to a starting resource block, and may indicate 3 as the number of resource blocks allocated. A hopping flag of the uplink grant may not indicate frequency hopping. The resource blocks corresponding to the resource block indices I=21 and 22 belong to a data region. The UE may use the resource blocks corresponding to the resource block indices I=21 and 22 both in a first slot and a second slot. The resource block corresponding to the resource block index I=23 belongs to a control region. If an uplink grant allocates a resource block belonging to a control region, the uplink grant may include a control region indicator. The control region indicator indicates whether all resource blocks of the control region have been allocated to two slots in a subframe or only to one of the first and second slots in the subframe. The control region indicator may be newly added to an uplink grant. Alternatively, the control region indicator may use a filed which has been previously included in an uplink grant. For example, the control region indicator may use a slot indicator described above with reference to FIG. 11. The control region indicator is described below in more detail.

First, a case where the size of a control region indicator is 1 bit is described.

It is assumed that a UE knows that a resource block corresponding to a resource block index I=23 in a first slot has not been reserved for a control channel. For example, if a boundary indicator indicates the number of resource blocks used for a control region in one slot, a UE may know that the resource block corresponding to the resource block index I=23 in the first slot and a resource block corresponding to a resource block index I=1 in a second slot have not been reserved for the control channel. In this case, the control region indicator has only to indicate whether the resource block corresponding to a resource block index I=23 in the second slot has been allocated.

However, the UE knows only the boundary between a control region and a data region, but may do not know that the resource block corresponding to the resource block index I=23 in the first slot has not been reserved for the control channel. In this case, an assumption that the last control channel index is not used may be previously defined between a BS and the UE. Here, the last control channel index in the control region is m=3. A resource block corresponding to the resource block index I=23 in the first slot is m=3, and a resource block corresponding to a resource block index I=23 in the second slot is m=2. In this case, a control region indicator has only to indicate whether the resource block corresponding to the resource block index I=23 in the second slot has been allocated.

For example, if the control region indicator is 0, it is assumed that the resource block corresponding to the resource block index I=23 in the second slot has not been allocated. In this case, resource blocks corresponding to the resource block indices I=21 and 22 both in the first slot and the second slot are allocated to the UE, and a resource block corresponding to the resource block index I=23 only in the first slot is allocated to the UE. If the control region indicator is 1, the resource blocks corresponding to the respective resource block indices I=21 to 23 both in the first and second slots are allocated to the UE.

Second, a case where the size of a control region indicator is 2 bits is described below. In this case, the degree of freedom capable of indicating the allocation of resource blocks is increased as compared with a case where the size of a control region indicator is 1 bit. The following table shows an example of meanings depending on the value of a control region indicator when the size of the control region indicator is 2 bits.

TABLE 2

| Control region indicator | Description | |
|---|---|---|
| | 1st slot | 2nd slot |
| 00 | not assigned | not assigned |
| 01 | not assigned | assigned |
| 10 | assigned | not assigned |
| 11 | assigned | assigned |

For example, when the control region indicator indicates 01, the resource blocks of a first slot belonging to a control region are not allocated to a UE, but only the resource blocks of a second slot are allocated to the UE. In this case, resource blocks corresponding to resource block indices I=21 and 22 both in a first slot and a second slot are allocated to the UE, but a resource block corresponding to a resource block index I=23 only in the second slot is allocated to the UE.

Figure 18:
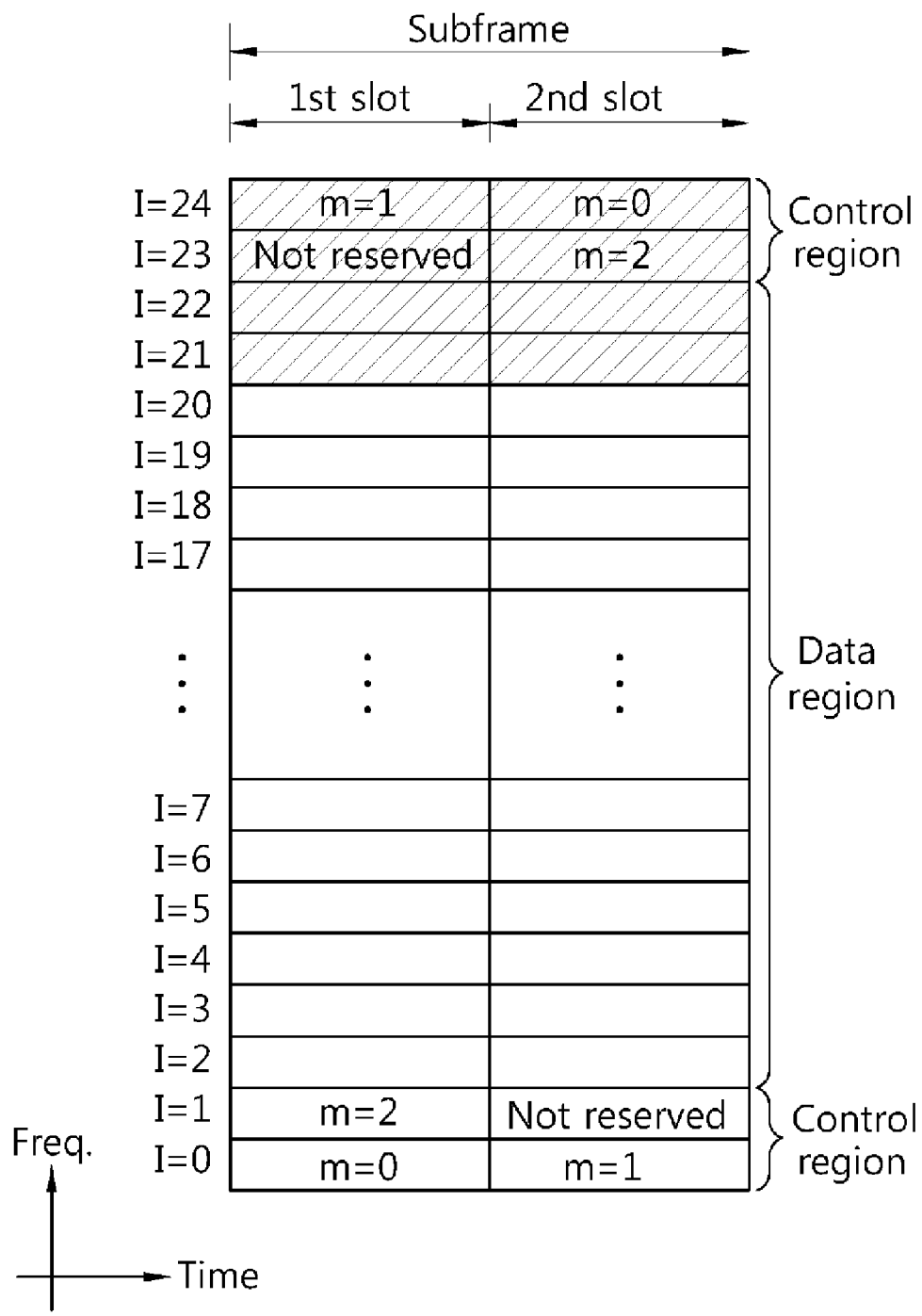
FIG. 18 shows another example in which resource blocks for the transmission of uplink data are allocated in a control region and a data region.

FIG. 18 shows another example in which resource blocks for the transmission of uplink data are allocated in a control region and a data region.

Referring to FIG. 18, resource blocks corresponding to respective resource block indices I=21 to 24 are allocated to a UE through an uplink grant. In this case, a resource allocation field of the uplink grant may indicate I=21 as a resource block index, corresponding to a starting resource block, and may indicate 4 as the number of resource blocks allocated. A hopping flag of the uplink grant may not indicate frequency hopping. The resource blocks corresponding to the resource block indices I=21 and 22 belong to a data region. The UE may use the resource blocks corresponding to the resource block indices I=21 and 22 both in a first slot and a second slot. The resource blocks corresponding to the resource block indices I=23 and 24 belong to a control region. A control region indicator of the uplink grant must indicate each of the resource block indices I=23 and I=24.

If the number of resource blocks belonging to the control region, which belong to the resource blocks allocated by the uplink grant, increases, the number of states which must be indicated by the control region indicator also increases. Accordingly, the size of the control region indicator increases. In order to take the full flexibility into consideration, the final bit size of the control region indicator may be taken into consideration with consideration taken of both the number of resource blocks belonging to the control region, allocated through the uplink grant, and the number of states of the resource blocks. For example, assuming that the total number of cases which must be supported by a control region indicator is N, the total bit size of the control region indicator is log 2N. As described above, the size of a control region indicator may vary depending on the number of resource blocks belonging to an allocated control region. Alternatively, the size of a control region indicator may be differently set depending on the uplink bandwidth. For example, when Nul is 25, resource blocks belonging to a control region may be set so that the resource blocks may be allocated up to a maximum of 8 through an uplink grant. In this case, in order to independently indicate the states of each of the 8 resource blocks, the size of a control region indicator may be 8 bits. In actual implementation, the control region indicator may be implemented using only bits smaller than the 8 bits.

As described above, in the case where the number of resource blocks used for a control region in one slot is an odd number, there are resource blocks not used for the transmission of control information in the control region. In the methods described so far, resource blocks not used for the transmission of control information are managed as resource blocks in the control region. However, a method of inserting the resource blocks into a data region and managing the inserted resource blocks is also possible.

Figure 19:
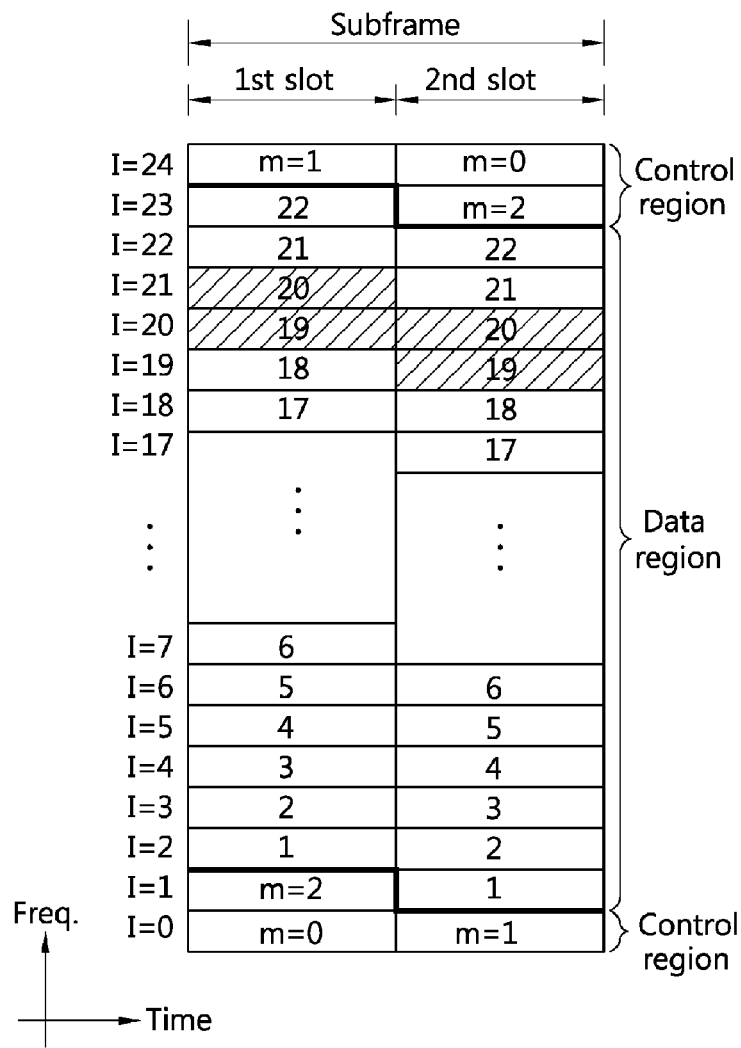
FIG. 19 shows an example in which resource blocks having different resource block indices in a data region constitute data channel resource block pairs.

FIG. 19 shows an example in which resource blocks having different resource block indices in a data region constitute data channel resource block pairs.

Referring to FIG. 19, resource blocks corresponding to respective resource block indices I=2 to I=23 in a first slot in a subframe belong to a data region. Resource blocks corresponding to respective resource block indices I=1 to I=22 in a second slot in the subframe belong to a data region. It is, hereinafter, assumed that a data channel index, indicating a data channel resource block pair, is n. For example, when a data channel index is n=3, the resource block corresponding to the resource block index 2 in the first slot and the resource block corresponding to the resource block index 3 in the second slot constitute a data channel resource block pair corresponding to the data channel index n=3. That is, a data channel resource block pair includes resource blocks which go crisscross with each other. If the number of resource blocks used for a control region in one slot is an even number, a data channel resource block pair includes resource blocks having the same resource block index.

If a UE may exactly know the number of resource blocks used for a control region in one slot, the UE may know whether a data channel resource block pair in a data region includes resource blocks which go crisscross with each other. If a UE cannot exactly know the number of resource blocks used for a control region in one slot, a BS may perform additional signaling. Additional signaling may indicate whether a data channel resource block pair includes resource blocks which go crisscross with each other. Alternatively, additional signaling may indicate whether the number of resource blocks used for a control region in one slot is an even number or an odd number.

As described above, a method of efficiently transmitting uplink data can be provided. Accordingly, limited radio resources can be efficiently used. Consequently, the entire system performance can be improved.

Figure 20:
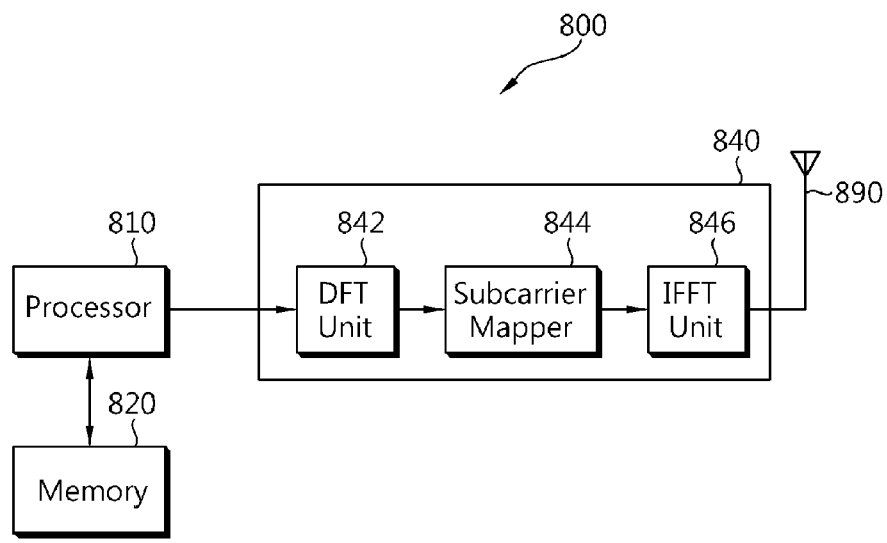
FIG. 20 is a block diagram of an apparatus for a wireless communication.

FIG. 20 is a block diagram of an apparatus for a wireless communication. The apparatus may be part of a UE.

Referring to FIG. 20, the apparatus 800 for wireless communication includes a processor 810, memory 820, and a signal generator 840. The memory 820 stores basic sequences. The processor 810 is coupled with the memory 820 and the signal generator 840. The processor 810 processes uplink data and performs all the above-described methods regarding the transmission of uplink data. The signal generator 840 generates a radio signal which will be transmitted via an antenna 890, based on uplink data processed by the processor 810, and transmits the generated radio signal.

The signal generator 840 may generate a transport signal of an SC-FDMA method. For this, the signal generator 840 may include a Discrete Fourier Transform (DFT) unit 842 configured to perform DFT, a DFT subcarrier mapper 844, and an Inverse Fast Fourier Transform (IFFT) unit 846 configured to perform IFFT. The DFT unit 842 performs DFT on input sequences and outputs frequency domain symbols. The subcarrier mapper 844 maps the frequency domain symbols to respective subcarriers. The IFFT unit 846 performs IFFT on the received symbols and outputs a time domain signal. The time domain signal becomes a transport signal and is transmitted via the antenna 890. A time domain signal can be generated based on the time domain signal generated by the signal generator 840 using an SC-FDMA method. Here, the time domain signal output by the signal generator 840 is called an SC-FDMA symbol or an OFDMA symbol.

Figure 21:
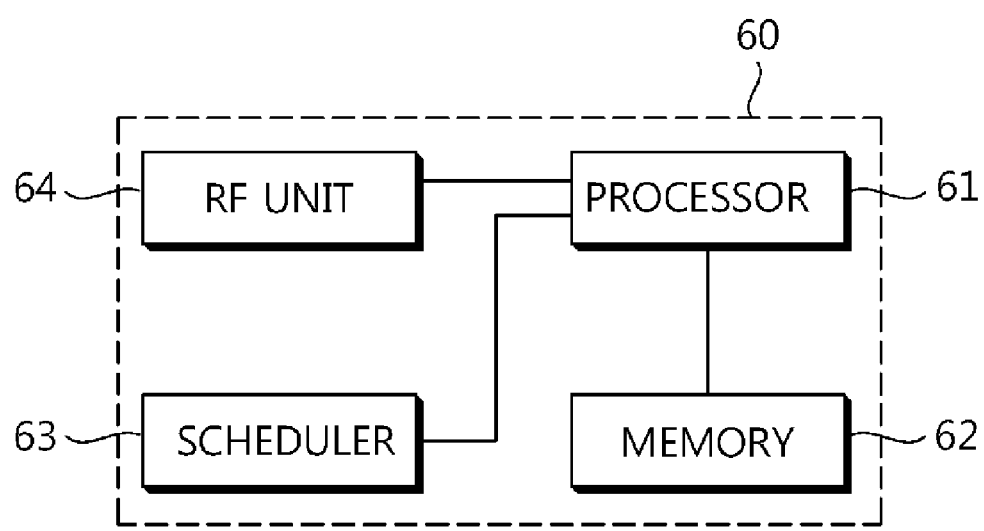
FIG. 21 is a block diagram showing an example of a base station (BS).

FIG. 21 is a block diagram showing an example of a BS. The BS 60 includes a processor 61, memory, 62, a scheduler 63, and an RF unit 64. The RF unit 64 is coupled to the processor 61 and is configured to transmit and receive a radio signal. The processor 61 may perform all the above methods related to the transmission of uplink data by a UE. The memory 62 is coupled to the processor 61 and is configured to store pieces of information processed by the processor 61. The scheduler 63 is coupled to the processor 61 and is configured to perform all the methods regarding radio resources scheduling in relation to the transmission of uplink data by a UE.

All the above functions may be processed by a processor, such as a microprocessor, a controller, a microcontroller, and an Application Specific Integrated Circuit (ASIC) depending on software or program codes which are coded to perform the functions. The design, development, and implementation of the codes will be evident to those skilled in the art based on the prevent invention.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method of transmitting uplink data in a wireless communication system, carried in a user equipment (UE), the method comprising:
   receiving an uplink grant from a base station (BS), the uplink grant comprising a resource allocation field and a slot indicator, the resource allocation field comprising a resource block index which is an index of a resource block selected among a plurality of resource blocks in a control region of a subframe, the slot indicator indicating one of two slots in the subframe; and
   transmitting uplink data through a first resource block which is indicated by a resource block index in a slot indicated by the slot indicator in the subframe.

2. The method of claim 1, wherein the second resource block which is indicated by a resource block index in the other slot of the two slots not indicated by the slot indicator in the subframe is punctured.

3. The method of claim 2, wherein control information of other UE is transmitted through the second resource block.

4. The method of claim 1, further comprising:
   transmitting the uplink data through a second resource block in the other slot of the two slots not indicated by the slot indicator in the subframe.

5. The method of claim 4, wherein the first resource block and the second resource block are different in a frequency domain.

6. The method of claim 4, wherein the second resource block is indicated by the resource block index.

7. The method of claim 1, further comprising:
   receiving a boundary indicator from the BS, the boundary indicator indicating whether the resource block indicated by the resource block index belongs to the control region of the subframe.

8. An apparatus for a wireless communication, the apparatus comprising:
   a signal generator configured to generate and transmit a radio signal; and
   a processor coupled with the signal generator and configured to:
   receive an uplink grant, the uplink grant comprising a resource allocation field and a slot indicator,
   the resource allocation field comprising a resource block index which is an index of a resource block selected among a plurality of resource blocks in a control region of a subframe,
   the slot indicator indicating one of two slots in the subframe; and
   transmit data through a resource block which is indicated by a resource block index in a slot indicated by the slot indicator in the subframe.

* * * * *